United States Patent
Oyama et al.

(10) Patent No.: US 12,492,983 B2
(45) Date of Patent: Dec. 9, 2025

(54) SPECTRAL ANALYSIS METHOD, ANALYSIS APPARATUS AND ANALYSIS PROGRAM

(71) Applicant: JASCO CORPORATION, Tokyo (JP)

(72) Inventors: Taiji Oyama, Tokyo (JP); Hisashi Masago, Tokyo (JP); Satoko Suzuki, Tokyo (JP)

(73) Assignee: JASCO CORPORATION, Tokyo (JP)

( * ) Notice: Subject to any disclaimer, the term of this patent is extended or adjusted under 35 U.S.C. 154(b) by 0 days.

(21) Appl. No.: 18/436,498

(22) Filed: Feb. 8, 2024

(65) Prior Publication Data
US 2024/0295491 A1    Sep. 5, 2024

(30) Foreign Application Priority Data
Feb. 9, 2023    (JP) .................................. 2023-18668

(51) Int. Cl.
  *G01N 21/25*    (2006.01)
  *G01J 3/28*    (2006.01)
  *G01N 21/19*    (2006.01)

(52) U.S. Cl.
  CPC .............. *G01N 21/255* (2013.01); *G01J 3/28* (2013.01); *G01N 21/19* (2013.01); *G01N 2201/1293* (2013.01)

(58) Field of Classification Search
  CPC ................. G01N 21/255; G01N 21/19; G01N 2201/1293; G01J 3/28
  (Continued)

(56) References Cited

U.S. PATENT DOCUMENTS

6,415,223 B1    7/2002    Lin et al.
6,584,413 B1 *  6/2003    Keenan ..................... G01J 3/28
                                                    702/194

(Continued)

FOREIGN PATENT DOCUMENTS

JP    2009-540322    11/2009
JP    2019-522802    8/2019

(Continued)

OTHER PUBLICATIONS

Sawall, Mathias, et al. "A chemometric study in the area of feasible solution of an acid-base titration of N-methyl-6-oxyquinolone." RSC advances 8.18 (2018): 9922-9932. (Year: 2018).*

(Continued)

*Primary Examiner* — Michelle M Iacoletti
*Assistant Examiner* — Noah J. Haney
(74) *Attorney, Agent, or Firm* — Greenblum & Bernstein, P.L.C.

(57) ABSTRACT

A spectral analysis method for thermodynamically analyzing performs multivariate analysis to a plurality of measurement spectra measured under a plurality of measurement parameters, using MCR method that separates a pure spectrum from the plurality of measurement spectra, and calculates a concentration value of each pure spectrum. In this method, an equilibrium model corresponding to an equilibrium state of a sample in which three or more types of chemical species coexist is set, and at least one chemical-equilibrium equation corresponding to the equilibrium model is set. In the MCR method, a concentration curve based on the chemical-equilibrium equation is fitted to the calculated concentration values, an optimal value of a thermodynamic parameter is acquired, a new concentration value is acquired from the chemical-equilibrium equation (Continued)

based on the optimal value, and thus the concentration value is constrained.

10 Claims, 8 Drawing Sheets

(58) Field of Classification Search
USPC .......................................................... 356/300
See application file for complete search history.

(56) References Cited

U.S. PATENT DOCUMENTS

| | | | |
|---|---|---|---|
| 6,980,285 B1* | 12/2005 | Hansen | G01J 3/28 |
| | | | 356/41 |
| 9,383,308 B2* | 7/2016 | Bradley | G01J 3/2803 |
| 2005/0043902 A1 | 2/2005 | Haaland et al. | |
| 2010/0027003 A1 | 2/2010 | Cappel | |
| 2021/0131951 A1 | 5/2021 | Dai et al. | |
| 2021/0149361 A1* | 5/2021 | Jungbauer | G01N 30/88 |

FOREIGN PATENT DOCUMENTS

| | | | | |
|---|---|---|---|---|
| JP | 2019-537006 | | 12/2019 | |
| JP | 2022179047 A | * | 12/2022 | G01N 21/65 |
| WO | 2015/097217 | | 7/2015 | |

OTHER PUBLICATIONS

Jaumot, Joaquim, Montse Vives, and Raimundo Gargallo. "Application of multivariate resolution methods to the study of biochemical and biophysical processes." Analytical biochemistry 327.1 (2004): 1-13. (Year: 2004).*

Chen, Yu-Jou. Detection of Single Water Molecules in Water-THF Complexes in the Condensed Phase by Raman Spectroscopy and Multivariate Curve Resolution With Alternating Least-Squares (MCR-ALS). MS thesis. National Yang Ming Chiao Tung University, 2021. (Year: 2021).*

Goftar, Masoud Karimi, Nasrollah Moradi Kor, and Zahra Moradi Kor. "Spectrophotometric determination of concentration profiles and thermodynamic parameters of aggregation phenomena of rhodamine B by application of multivariate curve resolution." (2014): 110-115. (Year: 2014).*

Office Action issued in Corresponding JP Patent Application No. 2023-018668, dated May 29, 2023, along with an English translation thereof.

Decision to Grant a Patent issued in Corresponding JP Patent Application No. 2023-018668, dated Jun. 27, 2023, along with an English translation thereof.

* cited by examiner

SPECTRAL ANALYSIS METHOD, ANALYSIS APPARATUS AND ANALYSIS PROGRAM

RELATED APPLICATIONS

This application claims the priority of Japanese Patent Application No. 2023-18668 filed on Feb. 9, 2023, the disclosure of which is incorporated herein by reference in its entirety.

TECHNICAL FIELD

The present invention relates to a technique of thermodynamically analyzing spectral data.

BACKGROUND ART

Conventionally, as an analysis apparatus for an infrared absorption spectrum (IR spectrum) or a Raman scattering light spectrum, an analysis apparatus using Multivariate Curve Resolution-Alternating Least Squares (MCR-ALS) method is widely used. MCR-ALS method is a technique of resolving a pure spectrum and the corresponding concentration value from a spectral data of a mixture. Generally, the method comprises steps of estimating an initial value of either the pure spectrum or the concentration value, calculating the pure spectrum and the concentration value alternately by using a constraint condition such as a non-negative condition, and acquiring the pure spectrum and concentration value optimized by repeating the calculation. For example, Patent literature 1 describes an art of acquiring distribution images of various compounds that exist in the sample by using MCR-ALS method.

PRIOR ART

Patent literature 1: Japanese Unexamined Patent Publication No. 2009-540322

Object and Summary of the Invention

The inventors have been developing a spectral analysis apparatus suitable for thermodynamical analysis of spectra based on the above-described MCR-ALS method. In particular, in order to thermodynamically analyze spectra obtained by measuring a variation of an equilibrium state regarding a sample in which three or more types of chemical species coexist, they considered that it is important to find not only the conventional non-negative condition, but a new constraint condition that can be used together or instead with/of the conventional non-negative condition, as the constraint condition of the pure spectra or the concentration value on the MCR-ALS method.

Solution to Problem

That is, a spectral analysis method according to the present invention is a method of spectrally analyzing a plurality of measurement spectra by using Multivariate Curve Resolution (MCR) method that, on the assumption that the measurement spectrum acquired by measuring a sample is represented as a linear combination of the same number of pure spectra as the number of components, using concentration values of the pure spectra as coefficients, separates the same number of pure spectra as the number of components from the plurality of measurement spectra and calculates the concentration value of each pure spectrum, the method comprising steps of:

setting an equilibrium model corresponding to an equilibrium state of the sample in which three or more types of chemical species coexist, setting at least one chemical-equilibrium equation corresponding to the equilibrium model, starting the MCR to the plurality of measurement spectra, repeating processings (A) and (B) to acquire a thermodynamic parameter, the pure spectra and the concentration value of each pure spectrum corresponding to the equilibrium model, wherein:

(A) is a processing of acquiring an optimal value of the thermodynamic parameter that configures the chemical-equilibrium equation by fitting a concentration curve based on the chemical-equilibrium equation to the calculated concentration value, and (B) is a processing of acquiring a new concentration value from the chemical-equilibrium equation using the optimal value of the thermodynamic parameter, separating the pure spectra by using the new concentration value and calculating the concentration value.

In the spectral analysis method, the measurement spectrum is preferably a data containing positive and negative spectral intensity values, and particularly any one of a circular dichroism spectrum, a vibrational circular dichroism spectrum, a circularly polarized fluorescent spectrum, a fluorescence detection circular dichroism spectrum and an optical rotatory dispersion spectrum.

In the spectral analysis method, the plurality of measurement spectra is preferably a data measured while varying the equilibrium state of a reaction between a reactant and a product contained in the sample by sequentially varying a measurement condition, and the measurement condition is preferably any one of temperature, concentration, pH, pressure of the sample, applied electric field, applied magnetic field, irradiation light to the sample or a combination thereof, and thereby the thermodynamic parameter, the pure spectra and the concentration value of each pure spectrum corresponding to the equilibrium model regarding the reactant and the product are preferably acquired.

In the spectral analysis method, the reaction between the reactant and the product preferably includes a reaction between the reactant and an intermediate and a reaction between the intermediate and the product, and the thermodynamic parameter, the pure spectra and the concentration value of each pure spectrum corresponding to the equilibrium model regarding the reactant, the intermediate and the product are preferably acquired.

In the spectral analysis method, the thermodynamic parameter, the pure spectra and the concentration value of each pure spectrum corresponding to the equilibrium model regarding two or more types of chemical species that configure the reactant or the product are preferably acquired inclusively.

In the spectral analysis method, the thermodynamic parameter, the pure spectra and the concentration value of each pure spectrum corresponding to the equilibrium model regarding two or more types of chemical species that configure the intermediate are preferably acquired inclusively.

In the spectral analysis method, the reactant and the product are preferably substances formed of any one of proteins, peptides, nucleic acids, glycans, lipids, low molecules or a combination thereof, and the thermodynamic parameter, the pure spectra and the concentration value of each pure spectrum corresponding to the equilibrium model regarding the substance formed of any one of proteins, peptides, nucleic acids, glycans, lipids, low molecules or a combination thereof are preferably acquired inclusively.

Moreover, a spectral analysis apparatus according to the present invention comprises:

a Multivariate Curve Resolution (MCR) executing processor that, on the assumption that a measurement spectrum acquired by measuring a sample is represented as a linear combination of the same number of pure spectra as the number of components, using concentration values of the pure spectra as coefficients, separates the same number of pure spectra as the number of components from a plurality of measurement spectra and calculates the concentration value of each pure spectrum, and a constraint condition setting processor that sets a constraint condition of the concentration value used for Multivariate Curve Resolution-Alternating Least Squares (MCR-ALS) in the MCR executing processor, wherein:

the constraint condition setting processor is configured to set an equilibrium model corresponding to an equilibrium state of the sample in which three or more types of chemical species coexist, and set at least one chemical-equilibrium equation corresponding to the equilibrium model, and the MCR executing processor is configured to repeat processing (A) and (B) to acquire a thermodynamic parameter, the pure spectra and the concentration value of each pure spectrum corresponding to the equilibrium model, wherein:

(A) is a processing of acquiring an optimal value of the thermodynamic parameter that configures the chemical-equilibrium equation by fitting a concentration curve based on the chemical-equilibrium equation to the calculated concentration value, and (B) is a processing of acquiring a new concentration value from the chemical-equilibrium equation using the optimal value of the thermodynamic parameter, and separating the pure spectra by using the new concentration value and calculating the concentration value.

Moreover, a spectral analysis program according to the present invention is a program for spectrally analyzing a plurality of measurement spectra by using Multivariate Curve Resolution (MCR) method that, on the assumption that the measurement spectrum acquired by measuring a sample is represented as a linear combination of the same number of pure spectra as the number of components, using concentration values of the pure spectra as coefficients, separates the same number of pure spectra as the number of components from the plurality of measurement spectra and calculates the concentration value of each pure spectrum, the program that makes a computer to execute steps of:

setting an equilibrium model corresponding to an equilibrium state of the sample in which three or more types of chemical species coexist, setting at least one chemical-equilibrium equation corresponding to the equilibrium model, starting the MCR to the plurality of measurement spectra, repeating processing (A) and (B) to acquire a thermodynamic parameter, the pure spectra and the concentration value of each pure spectrum corresponding to the equilibrium model, wherein:

(A) is a processing of acquiring an optimal value of the thermodynamic parameter that configures the chemical-equilibrium equation by fitting a concentration curve based on the chemical-equilibrium equation to the calculated concentration value, and (B) is a processing of acquiring a new concentration value from the chemical-equilibrium equation using the optimal value of the thermodynamic parameter, separating the pure spectra by using the new concentration value and calculating the concentration value.

Advantageous Effects of Invention

In the spectral analysis method, the analysis apparatus, and the analysis program according to the present invention described above, the equilibrium model corresponding to the equilibrium state of the sample in which three or more types of chemical species coexist and at least one chemical-equilibrium equation according to the equilibrium model are set for using the equilibrium model and the chemical-equilibrium equation to the constraint condition of the concentration value in MCR-ALS method.

In the processing (A) after the start of MCR, the thermodynamic parameter such that the chemical-equilibrium equation fits to calculated values of the concentration value is searched (this is also called as a parameter fitting). In the processing (B), the new concentration value is acquired based on the chemical-equilibrium equation using the searched thermodynamic parameter. Even with the sample in which three or more types of chemical species coexist, the spectral data that obtained by measuring processes of variation of its equilibrium state can be thermodynamically analyzed and a thermodynamic parameter can be acquired by constraining the concentration value with the processing based on the equilibrium model and the chemical-equilibrium equation. The present invention is not limited to the data including positive and negative spectral intensity values such as a circular dichroism spectrum, a vibrational circular dichroism spectrum, a circularly polarized fluorescent spectrum, a fluorescence detection circular dichroism spectrum, and an optical rotatory dispersion spectrum, and it can be applied to thermodynamic analysis of various spectral data such as a Raman scattering spectrum, an infrared spectrum, an ultraviolet visible near-infrared spectrum and a fluorescent spectrum, for example.

Since MCR-ALS method is a method that theoretically searches a numerically optimal solution, it may fall into a local optimal solution (so-called a local minimum), and choose information that is physically and chemically meaningless. Accordingly, the following points have been devised conventionally such that information that is physically and chemically meaningful can be extracted.

(1) Estimation of the suitable number of components (using an eigenvalue based on a principal component analysis).

(2) Estimation of a suitable initial value (using an eigenvector based on a principal component analysis or a right-singular vector based on a singular value decomposition).

(3) Setting of a suitable constraint condition (non-negative constraint of concentration and spectrum).

The non-negative constraint of a spectrum, however, can be applied to a spectral data such that the spectral intensity values are only positive (or negative), but it cannot be applied to a spectral data such that the spectral intensity values are positive and negative such as a circular dichroism spectrum, for example. On the contrary, in the present invention, when the measurement spectrum is the data that contains positive and negative spectral values such as a circular dichroism spectrum, a vibrational circular dichroism spectrum, a circularly polarized fluorescent spectrum, a fluorescence detection circular dichroism spectrum, and an optical rotatory dispersion spectrum, for example, by using the concentration value constraint with the processing based on the equilibrium model and the chemical-equilibrium equation, it becomes possible not to use the non-negative constraint to the pure spectrum; therefore, the thermodynamic analysis using MCR-ALS can be performed to the spectral data containing positive ang negative spectral intensity values.

In the technique of thermodynamically analyzing the spectrum using MCR-ALS, the present invention managed to establish the technique of constraining the concentration value by the processing based on the equilibrium state and the chemical-equilibrium equation as the new constraint condition that can be used instead of or together with the condition that executes the non-negative constraint to a pure spectrum.

BEST MODE FOR CARRYING OUT THE INVENTION

Figure 1:
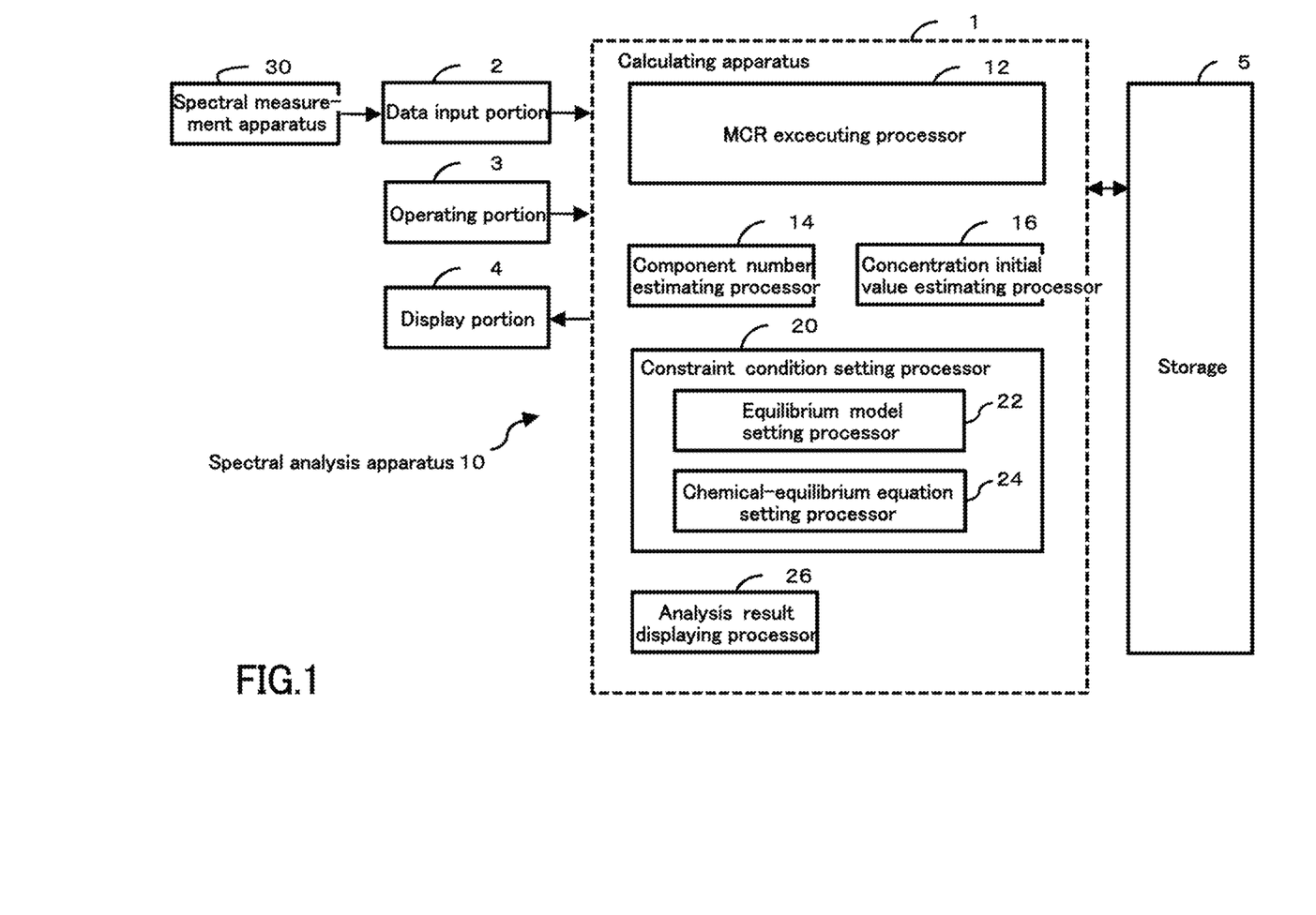
FIG. 1 is a block diagram that illustrates a configuration example of a spectral analysis apparatus according to one embodiment of the present invention.

In the following, preferred embodiments of the present invention are described with reference to the drawings. FIG. 1 is a block diagram that illustrates a configuration example of a spectral analysis apparatus according to one embodiment of the present invention. A spectral analysis apparatus 10 executes a program of Multivariate Curve Resolution (MCR) to thermodynamically analyze a plurality of measurement spectra measured by a spectral measurement apparatus 30, and is configured of a computer and its surrounding devices. It comprises a calculating apparatus 1, a data input portion 2, an operating portion 3, a display portion 4, and a storage 5 as shown in FIG. 1.

The calculating apparatus 1 is configured to comprise a CPU, for example, and it works as a functioning portion of various portions such as an MCR executing processor 12, a component number estimating processor 14, a concentration initial value estimating processor 16, a constraint condition setting processor 20 and an analysis result displaying processor 26.

The data input portion 2 is connected to various spectral measurement apparatus 30 to receive a data of the measurement spectrum upon analysis.

The spectral measurement apparatus 30 is an apparatus that spectrally measures a sample by setting the sample that is in a container such as a sample cell into a sample chamber, irradiating a specific light, and detecting a transmitted light, a reflected light, an emitted light, and a scattering light of the sample. Here, a case in which the spectral measurement apparatus 30 is a circular dichroism (CD) spectral measurement apparatus is described as an example; however, a vibrational circular dichroism (VCD) spectral measurement apparatus, a circularly-polarized luminescence (CPL) spectral measurement apparatus, a fluorescence detection circular dichroism (FDCD) spectral measurement apparatus, an optical rotatory dispersion (ORD) spectral measurement apparatus, a Raman scattering spectral measurement apparatus, an infrared (IR) spectral measurement apparatus, an ultraviolet visible near-infrared spectral measurement apparatus and a fluorescence spectral measurement apparatus can be used as the spectral measurement apparatus 30. That is, the spectral analysis apparatus 10 of the present embodiment can have a spectral data set, as an analysis target, measured by not only CD analysis, but also by various analyzing methods such as VCD analysis, CPL analysis, FDCD analysis, ORD analysis, Raman scattering light analysis, IR analysis, ultraviolet visible light analysis, and fluorescence analysis.

The sample contains a plurality of coexisting chemical species. A part of the chemical species is a reactant, and other part of the chemical species is a product. A reversible reaction between the reactant and the product is in an equilibrium state.

The spectral measurement apparatus 30 comprises devices for varying specific measurement parameters. The specific measurement parameters are, for example, temperature, pressure, sample concentration, pH, applied electric field, applied magnetic field, irradiation light, and stress load. The spectral measurement apparatus 30 uses devices for continuously varying the sample concentration or respective loads to execute spectral measurement of the sample under continuously varying measurement parameters. Varying measurement parameter of the sample concentration includes, for example, varying an addition amount of ligands or reactive reagents, or varying concentration of denaturant or additives.

Since the equilibrium state of the reversible reaction between the reactant and the product contained in the sample varies (moves) by varying the measurement parameters as described above, the spectral measurement apparatus 30 can acquire a plurality of measurement spectra that varies in accordance with the variation of the equilibrium state.

Here, a case of analyzing heat denaturation of protein is described as an example. The CD spectral measurement apparatus acquires a plurality of measurement CD spectra while varying the temperature condition of protein, and inputs a data thereof to the data input portion 2.

The spectral measurement apparatus 30 sequentially varies the temperature condition of the sample from the first condition to Nth condition, and measures the sample spectra each time. The spectral measurement apparatus 30 outputs a numerical sequence data of N measurement spectra in a data form of a measurement spectral matrix "X" as shown in Equation (1).

$$X = \underset{\text{Temperature condition: N}}{\begin{pmatrix} x_1 \\ x_2 \\ \vdots \\ x_N \end{pmatrix}} = \underset{\text{Temperature condition: N}}{\overset{\text{Number of components: n}}{\begin{pmatrix} c_{11} & c_{12} & \cdots & c_{1n} \\ c_{21} & c_{22} & \cdots & c_{2n} \\ \vdots & \vdots & & \vdots \\ c_{N1} & c_{N2} & \cdots & c_{Nn} \end{pmatrix}}} \underset{\text{Number of components: n}}{\begin{pmatrix} s_1 \\ s_2 \\ \vdots \\ s_n \end{pmatrix}} \quad \text{Equation (1)}$$

X: measurement spectral matrix
C: Concentration matrix
S: Pure spectral matrix
x: Measurement spectrum (row vector)
c: Concentration value
s: Pure spectrum (row vector)

Here, the numerical sequence data of one measurement spectrum is represented as "x". The measurement spectrum x is a row vector of m dimension, and is configured of a spectral intensity value of m wavenumber points. The measurement spectral numerical sequence measured under the first to Nth temperature condition is represented as "$x_1$, $x_2$, . . . , $x_N$" (they are all row vectors of m dimension), and one having these measurement spectra as a matrix component is a measurement spectral matrix X. The row direction (horizontal direction) of the matrix X corresponds to a wavelength direction of the spectrum, and the column direction (vertical direction) corresponds to variation of temperature condition. As described above, in the measurement spectral matrix X, m wavelength points aligned in the row direction have respective spectral intensity values, and the spectral intensity values vary in correspondence with N ways of temperature conditions aligned in the column direction; therefore, it can be said that the measurement spectral matrix X is a data set of spectra composed of "m variables".

The measurement spectral matrix X acquired as above is input to the calculating apparatus 1 via the data input portion 2. The data input portion 2 can be connected to the spectral measurement apparatus 30 by wired or wireless connection. Or, the measurement data acquired by the spectral measurement apparatus 30 may be input to the data input portion 2 via a memory medium. The spectral analysis apparatus and the spectral measurement apparatus may be configured integrally.

The storage 5 is configured of one or more memories, and is configured with ROM or RAM, for example. The operating portion 3 comprises a keyboard, a mouse or a touch panel, for example, and is configured such that the user can perform input work by operating the operating portion 3. The display portion 4 is configured with a liquid-crystal display apparatus, for example, and an analysis result is displayed on the display portion 4.

The MCR executing processor 12 executes Multivariate Curve Resolution to the measurement spectral matrix X that is input from the data input portion 2.

To start Multivariate Curve Resolution, the number of components n to be resolved must be set in advance. In the present embodiment, the component number estimating processor 14 estimates the number of chemical species contained in the sample by using a principal component analysis (PCA) method, and this is used as the number of components n. Other than estimating the number of components n by using PCA method and applying it as it is, the user may directly designate the numerical value of the number of components n. When the user knows how many components are contained in advance, any number of components can be set by the user's decision.

Moreover, to start Multivariate Curve Resolution, either initial values of pure spectra s (s in Equation (1) is a row vector) which the number of pure spectra s is same as the estimated number n of components or initial values of concentration values c according to n pure spectra must be set in advance. In the present embodiment, the concentration initial value estimating processor 16 estimates the initial value of concentration by an evolving factor analysis (EFA) method. Here, as shown in Equation (1), a provisional concentration matrix "C" is a matrix having the concentration value c (c is a scalar) of each component corresponding to the temperature condition as a component. When the concentration value of one component in one temperature condition is represented as "c", the concentration values of each component in the first temperature condition (N=1) are represented as "$c_{11}$, $c_{12}$, . . . , $c_{1n}$", and the concentration values of each component in the Nth temperature condition are represented as "$c_{N1}$, $c_{N2}$, . . . , $c_{Nn}$". The horizontal direction of the concentration matrix C corresponds to the number of components, and the vertical direction corresponds to variation of the temperature condition.

In Multivariate Curve Resolution, each measurement spectrum $x_1$ is assumed to be represented as a linear combination ($x_1 = c_{11}s_1 + c_{12}s_2 + \ldots + c_{1n}s_n$) of which the pure spectra $s_1$ to $s_n$ are multiplied by the concentration values $c_{11}$ to $c_{1n}$ of each pure spectrum, which the number of pure spectra is same as the number of components, and the pure spectral matrix S is decomposed from the measurement spectral matrix X to calculate the concentration matrix C. That is, based on the measurement spectral matrix X, the MCR executing processor 12 calculates the concentration matrix C and the pure spectral matrix S such that the sum of squares of the elements of residual matrix represented as X-CS becomes the minimum value with a technique of Alternating Least Squares (ALS).

To execute Multivariate Curve Resolution with this technique of Alternating Least Squares (ALS), the condition that constrains the pure spectrum s or the concentration value c, or the both must be set in advance. Therefore, in the present embodiment, the constraint condition setting processor 20 comprising an equilibrium model setting processor 22 and a chemical-equilibrium equation setting processor 24 is provided, so that the constraint condition of the concentration value c is set in advance.

First, the equilibrium model setting processor 22 sets an equilibrium model that represents an equilibrium state of a reversible reaction between the reactant and the product contained in the sample. For example, when the reactant is a protein in a natural state (N), the product is a protein in a denatured state (D), and the reversible reaction between the two obeys the equilibrium model of [N<=>D], information of this equilibrium model is imparted by the user's operation of the operating portion 3, so that the equilibrium model setting processor 22 can set the corresponding equilibrium model. Or, it may be configured such that the equilibrium model setting processor 22 automatically sets the equilibrium model to be set from numerous choices of equilibrium models based on substance names or state data of the reactant and the product contained in the sample. Moreover, the equilibrium model is set such that the number of chemical species contained in the equilibrium model matches with the estimated number n of components.

Moreover, the chemical-equilibrium equation setting processor 24 sets at least one equation of equilibrium constant K corresponding to the equilibrium model set by the equilibrium model setting processor 22. A publicly known equation of the equilibrium constant K corresponding to the measurement parameter varied by the spectral measurement apparatus 30 is known as the equation of the equilibrium constant K. For example, one equilibrium-constant K is present in the above-described equilibrium model of [N<=>D], and when the spectral data measured along with the temperature variation is to be analyzed, the publicly known equation of the equilibrium constant K can be set. The equation of the equilibrium constant K is configured with various thermodynamic parameters. In the chemical-equilibrium equation as used herein, the equation of the equilibrium constant K is included.

The chemical-equilibrium equation setting processor 24 can automatically set the number of the equilibrium constant K to be set according to the equilibrium model. On the other hand, when the equation of the equilibrium constant K is to be set specifically, the user may operate the operating portion 3 to impart specific information of the equation of the equilibrium constant K, so that the chemical-equilibrium equation setting processor 24 may set the specific equation of the equilibrium constant K. Or, the equation of the equilibrium constant K to be set may be automatically selected from choices of numerous equations of the equilibrium constant K based on information of types of varied measurement parameters.

A method of constraining the concentration value based on the equilibrium model and the equation of the equilibrium constant K set as described above will be described later (FIGS. 2 to 4).

After estimating the initial value and setting the constraint condition, Multivariate Curve Resolution is executed. The concentration matrix C and the pure spectral matrix S calculated by Multivariate Curve Resolution are memorized in the storage 5 while they are associated to each other.

Figure 2:
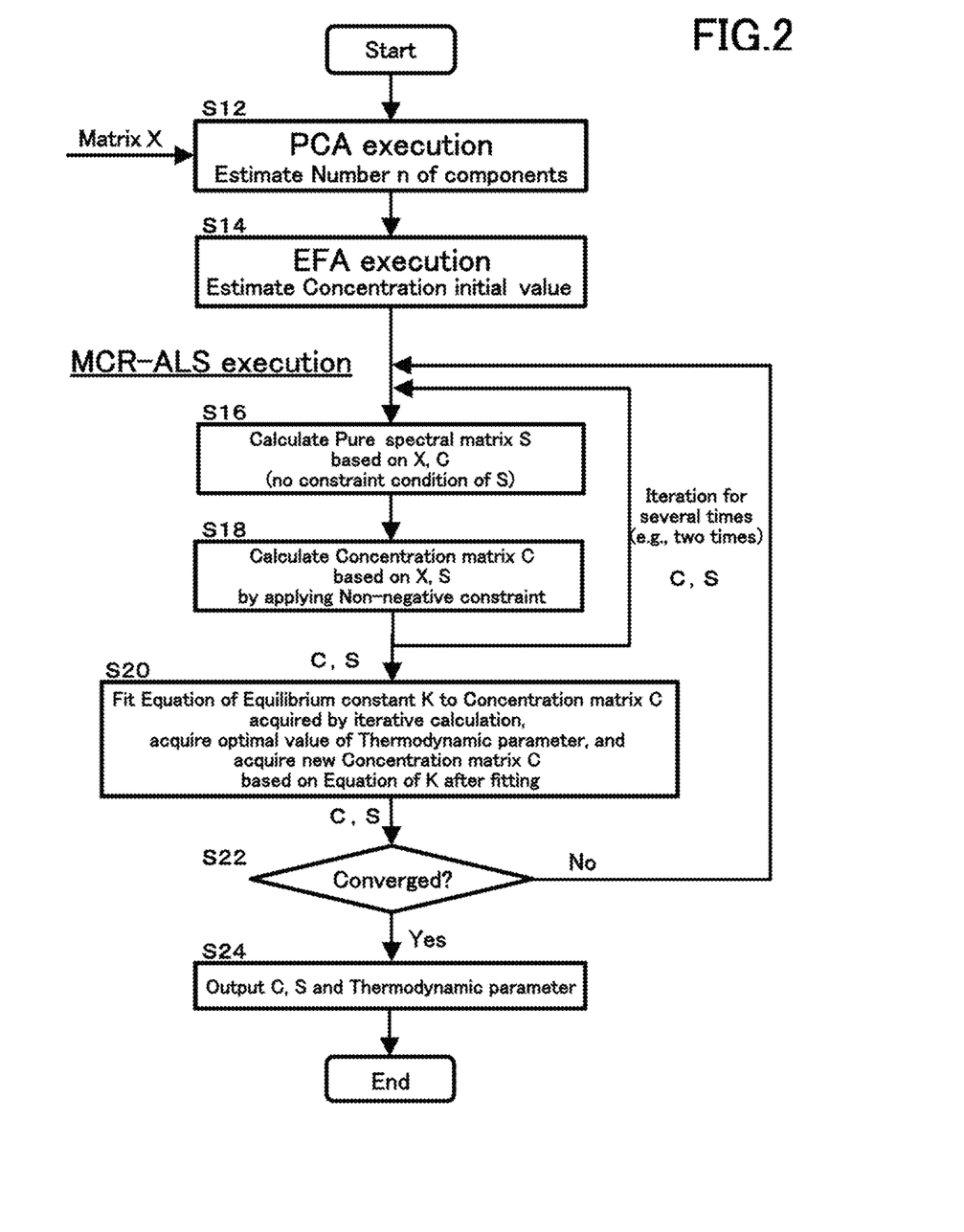
FIG. 2 is a flow diagram of processing that illustrates an example of MCR-ALS processing performed by the analysis apparatus.

FIG. 2 is a flow diagram of processing that shows an example of MCR-ALS processing by the calculating apparatus 1. At the start of analysis, a principal component analysis (PCA) is executed to the measurement spectral matrix X to estimate the number n of components (Step S12). Next, an evolving factor analysis (EFA) is executed to the measurement spectral matrix X to estimate the concentration initial value (Step S14). Then, the concentration matrix C based on the number n of components and the concentration initial value is used to execute Multivariate Curve Resolution to the measurement spectral matrix X (Steps S16 to S22).

In Step S16, a pure spectral matrix S is calculated based on the measurement spectral matrix X and the concentration matrix C composed of initial values. The pure spectral matrix S is a matrix having a numerical sequence, as a component, of n pure spectra s corresponding to n components as in Equation (1). When the numerical sequence of one pure spectrum is represented as "s", the pure spectrum s is a row vector of m dimension, i.e., it is configured of spectral intensity values of m wavelength points. Then, the numerical sequences of pure spectra of n components are represented as "$s_1, s_2, \ldots, s_n$" (all of them are row vectors of m dimension), and those that has n pure spectra as the matrix component is the pure spectral matrix S. The column direction (vertical direction) of the matrix S corresponds to the number of components, and the row direction (horizontal direction) corresponds to the wavelength direction of the spectrum.

In Step S16, the pure spectral matrix S is calculated by the following Equation (2).

$$S = (C^T C)^{-1} C^T X \qquad \text{Equation (2)}$$

Here, "$T$" represents a transposed matrix, and "$-1$" represents an inverse matrix.

When the measurement spectral matrix X is a CD spectral data, the pure spectral matrix contains both positive and negative spectral intensity values as an element like the CD spectral data. Therefore, the non-negative constraint cannot be applied to the element of the pure spectral matrix. Accordingly, the constraint condition to the pure spectral matrix S calculated in Step S16 is not provided.

Next, in Step S18, the concentration matrix C is calculated based on the measurement spectral matrix X and the pure spectral matrix S calculated in Step S16. The concentration matrix C is calculated by the following Equation (3).

$$C = X S^T (S S^T)^{-1} \qquad \text{Equation (3)}$$

When the calculated concentration matrix C has a negative element, a non-negative constraint of substituting the negative element with 0 is applied to acquire the concentration matrix C.

In the present embodiment, processing of Step S16 and Step S18 are iterated for several times (e.g., two times), and the concentration matrix C and the pure spectral matrix S acquired by iteration are used in the next Step S20.

In Step S20, a constraint by a thermodynamic equilibrium model is imparted to the concentration matrix C.

First, a case is described in which the equilibrium model and the equation of the equilibrium constant K of Table 1 is set.

TABLE 1

| Matrix X | Example of Analysis target | Equilibrium model | Equation of Equilibrium constant K | Thermodynamic parameters |
|---|---|---|---|---|
| Temperature dependence spectral data | Thermal denaturation of protein | $N \rightleftharpoons^K D$ | $K = \exp\left[\frac{\Delta H}{R}\left(\frac{1}{T_m} - \frac{1}{T}\right)\right]$ | $\Delta H$ $T_m$ |

Figure 3A:
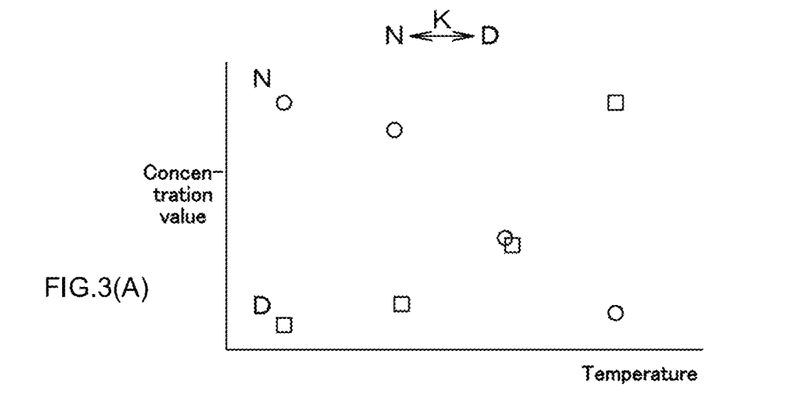
FIGS. 3(A), 3(B) and 3(C) are diagrams to describe a processing of constraining a concentration matrix of two components performed by the analysis apparatus.
Figure 3B:
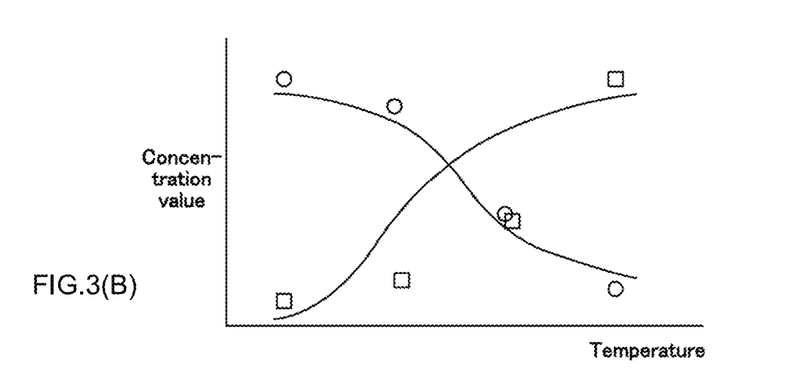
Figure 3C:
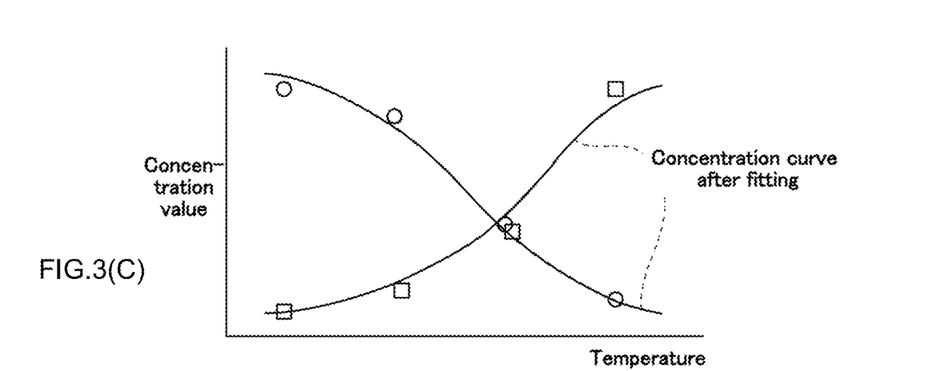

Here, in the equation of equilibrium constant K,
T: Sample temperature (Measurement parameter that was varied)
$\Delta H$: Enthalpy change
R: Gas constant
$T_m$ Denaturation midpoint temperature The equilibrium model of Table 1 is a two-components equilibrium model composed of the reactant (Natural N) and the product (Denaturation D), and there is one equilibrium constant K. Moreover, the number of components of the concentration matrix C is n=2. Based on FIG. 3, a processing of constraining the concentration matrix C of two components is described. First, FIG. 3 (A) is a graph of which the concentration values of each component of the concentration matrix C are plotted, having the temperature condition on the horizontal axis and the concentration value on the vertical axis. Next, a concentration curve defined for each component of the equilibrium model based on the equation of the equilibrium constant K is overlapped on the graph of FIG. 3 (A) (shown in FIG. 3 (B)). Then, the numerical values of the thermodynamic parameters ($\Delta H$ and $T_m$) that configure the equation of the equilibrium constant K are variously varied, and a processing of fitting the concentration curve to the concentration values of each component of the concentration matrix C is performed (FIG. 3 (C)). Upon calculating the optimal values of the thermodynamic parameters ($\Delta H$ and $T_m$), a least squares method such as Levenberg-Marquardt (LM) method may be applied. Finally, a new concentration matrix C based on the concentration value read out from each concentration curve after the processing of fitting is acquired. By executing these steps as described above, the concentration matrix C in the two-components equilibrium model can be constrained, and the pure spectral matrix using the new concentration matrix C can be calculated in the next step.

Next, a case is described in which the equilibrium model and the equation of the equilibrium constant K of Table 2 is set.

Figure 4A:
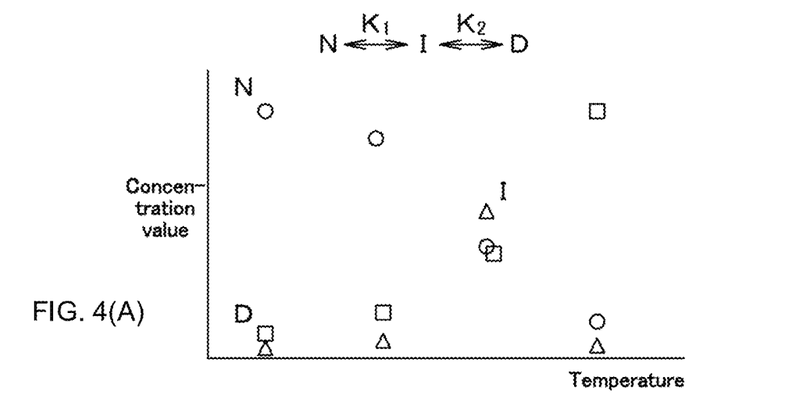
FIGS. 4(A), 4(B) and 4(C) are diagrams to describe a processing of constraining a concentration matrix of three components performed by the analysis apparatus.
Figure 4B:
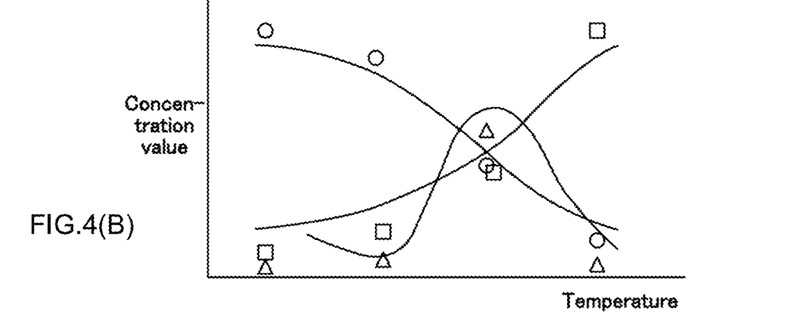
Figure 4C:
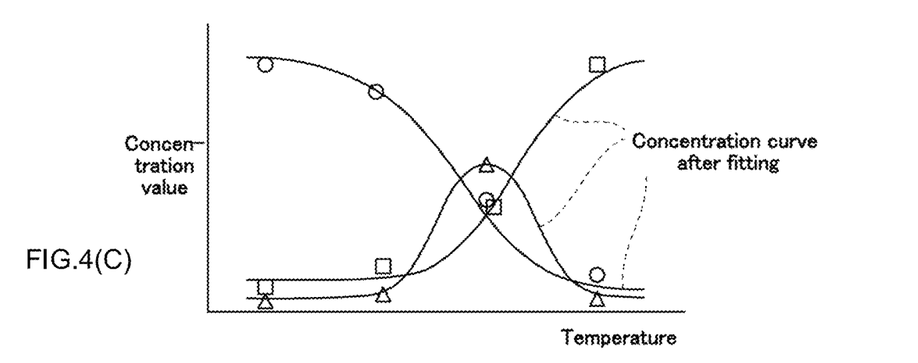

($\Delta H_1$, $T_{m,1}$, $\Delta H_2$, $T_{m,2}$) can be calculated by LM method. Finally, a new concentration matrix C based on the concentration value read out from each concentration curve after the fitting processing is acquired. By executing the steps as described above, the concentration matrix C can be constrained in the three-components equilibrium model, and the pure spectral matrix using the new concentration matrix C can be calculated in the next step.

By using the similar technique, the concentration matrix can be constrained in the equilibrium model of four or more components; however, description thereof is omitted herein.

Processing of Steps S16 to S20 is repeated until the constraint condition at Step S22 is satisfied. As an example of the constraint condition, when the root mean squared error (RMSE Spec.) between the separated pure spectrum and the pure spectrum separated in the previous turn becomes the specific threshold or lower, it may be determined to be "converged". Or, when the root mean squared error (RMSE Conc.) between the calculated concentration value and the concentration curve after the fitting processing becomes the specific threshold or lower, it may be determined to be "converged". Or, when the root mean squared error (RMSE Spec.) between a complex spectrum in which the calculated concentration value and the separated pure spectrum are synthesized and the measurement spectrum becomes the specific threshold or lower, it may be determined to be "converged".

In Step S24 after determination of being "converged", spectral analysis finishes by outputting or storing the concentration matrix C, the pure spectral matrix S and each thermodynamic parameter in the storage 5. As described above, the converged pure spectral matrix S can be acquired

TABLE 2

| Matrix X | Example of Analysis target | Equilibrium model | Equation of Equilibrium constant K | Thermodynamic parameters |
| --- | --- | --- | --- | --- |
| Temperature dependence spectral data | Thermal denaturation of Protein | $N \rightleftharpoons^{K_1} I \rightleftharpoons^{K_2} D$ | $K_1 = \exp\left[\frac{\Delta H_1}{R}\left(\frac{1}{T_{m,1}} - \frac{1}{T}\right)\right]$ <br> $K_2 = \exp\left[\frac{\Delta H_2}{R}\left(\frac{1}{T_{m,2}} - \frac{1}{T}\right)\right]$ | $\Delta H_1$ <br> $T_{m,1}$ <br> $\Delta H_2$ <br> $T_{m,2}$ |

Here, in the equation of the equilibrium constant $K_1$, $K_2$,
T: Sample temperature (Measurement parameter that was varied)
$\Delta H_i$: Enthalpy change
R: Gas constant
$T_{m,i}$: Denaturation midpoint temperature The equilibrium model of Table 2 is a three-component equilibrium model composed of the reactant (Natural N), the intermediate (I) and the product (Denaturation D). It shows a multistage reversible-reaction, and there are two equilibrium constants ($K_1$, $K_2$). Moreover, the number of components of the concentration matrix C is n=3. Based on FIG. 4, a processing of constraining the concentration matrix C of three components is described. First, FIG. 4 (A) is a graph of which the concentration values of each component of the concentration matrix C are shown like FIG. 3. Next, a concentration curve defined for each component of the equilibrium model based on the equation of the equilibrium constants $K_1$, $K_2$ is overlapped on the graph of FIG. 4 (A) (shown in FIG. 4 (B)). Then, the numerical values of the thermodynamic parameters ($\Delta H_1$, $T_{m,1}$, $\Delta H_2$, $T_{m,2}$) that configure the equation of the equilibrium constant $K_1$, $K_2$ are variously varied, and a processing of fitting the concentration curve to the concentration values of each component of the concentration matrix C is performed (FIG. 4 (C)). Like FIG. 3, the optimal values of the thermodynamic parameters as a spectral data of each chemical species, and the converged concentration matrix C can be acquired as the concentration value of chemical species of each measurement parameter.

The analysis result displaying processor 26 can graphically display the converged pure spectra as the spectral data of chemical species on the display portion 4, and can graphically display the concentration curve after the fitting processing as the concentration value of each chemical species that vary along with the measurement parameter. Together with these graphical displays, the calculated value of thermodynamic parameter corresponding to the set equilibrium model can also be displayed.

A program (program for a spectral analysis apparatus) for making the computer to function as the above-described spectral analysis apparatus can also be provided. In this case, the program may be configured to be provided in a state that it is stored in a memory medium, or provided as a program itself.

In the equilibrium model setting processor 22 and the chemical-equilibrium equation setting processor 24, equilibrium models or equations of chemical-equilibrium listed in Table 3 may be written to be usable in addition to the examples of Table 1 and Table 2. By designation of the user or determination of the spectral analysis apparatus itself, one to be used may be selected from those equilibrium models or equations of chemical-equilibrium. Upon determination by the spectral analysis apparatus itself, the spectral analysis apparatus may determine the optimal equilibrium model or equation of chemical-equilibrium based on the measurement spectra, information of the sample and the information of the measurement parameter.

TABLE 3

| Examples of Analysis target | Equilibrium model |
|---|---|
| When a reactant (N) forms a dimer. | $N_2 \overset{K}{\rightleftharpoons} 2D$ |
| When a product (D) has an equilibrium state between a dimer and a monomer. | $N_2 \overset{K_1}{\rightleftharpoons} D_2 \overset{K_2}{\rightleftharpoons} 2D$ |
| When a reactant (N) forms a dimer. | $N_2 \overset{K_1}{\rightleftharpoons} 2I \overset{K_2}{\rightleftharpoons} 2D$ |

TABLE 3-continued

| Examples of Analysis target | Equilibrium model |
|---|---|
| When there is an equilibrium state between two intermediates (I1, I2). | $N \overset{K_1}{\rightleftharpoons} I_1 \overset{K_2}{\rightleftharpoons} I_2 \overset{K_3}{\rightleftharpoons} D$ |
| Three-components equilibrium (when there is an equilibrium state between any two components). | $N \overset{K_1}{\rightleftharpoons} \overset{I}{\underset{K_3}{\rightleftharpoons}} \overset{K_2}{\rightleftharpoons} D$ |
| Equilibrium state between a reactant (A) of one component and a product (e.g., B, C) of multiple components. | $A \overset{K}{\rightleftharpoons} B + C$ |
| Equilibrium state between a reactant (e.g., A, B) of multiple components and a product (C) of one component. | $A + B \overset{K}{\rightleftharpoons} C$ |

Next, regarding a case of varying the measurement parameter other than temperature, an example is described in which the equilibrium model and the equation of equilibrium constant K of Table 4 are set.

TABLE 4

| Measurement spectral matrix X | Analysis target | Equilibrium model | Equilibrium constant K Thermodynamic | Thermodynamic parameters |
|---|---|---|---|---|
| Denaturant concentration variation spectral data | Chemical denaturation of sample by denaturant | $N \overset{K_1}{\rightleftharpoons} I \overset{K_2}{\rightleftharpoons} D$ | $K_1 = \exp\left[\frac{\mu}{RT}(C - C_{1/2,1})\right]$ $K_2 = \exp\left[\frac{\mu}{RT}(C - C_{1/2,2})\right]$ | $\mu$ $C_{1/2,1}$ $C_{1/2,2}$ |

Here, in the equations of equilibrium constants $K_1$, $K_2$,
C Denaturant concentration (Measurement parameter that was varied)
$\mu$ Cooperability parameter
R Gas constant
T Sample temperature (constant)
$C_{1/2,j}$ Denaturant concentration at denaturation midpoint Table 4 shows a case of which the spectral data of the sample is acquired while varing the denaturant concentration, and chemical denaturation of the sample by the denaturant is set as the analysis target. The equilibrium model is a three-components equilibrium model composed of a reactant (Natural N), an intermediate (I) and a product (Denaturation D), and there are two equilibrium constants ($K_1$, $K_2$). Fitting of the concentration curve is executed by using three thermodynamic parameters ($\mu$, $C_{1/2,1}$, $C_{1/2,2}$) in the equation of chemical-equilibrium.

Next, an example is described in which the equilibrium model and the equation of equilibrium constant K of Table 5 is set.

TABLE 5

| Measurement spectral matrix X | Analysis target | Equilibrium model | Equilibrium constant K | Thermodynamic parameters |
|---|---|---|---|---|
| Sample pressure variation spectral data | Variation of sample volume by sample pressure | $N \overset{K}{\rightleftharpoons} D$ | $K = \exp\left[-\frac{1}{RT}(\Delta G^0 + p\Delta V^0)\right]$ | $\Delta G^0$ $\Delta V^0$ |

Here, in the equation of equilibrium constant K,
p Sample pressure (Measurement parameter that was varied)
R Gas constant
T Sample temperature (constant)
$\Delta G^0$ Gibbs energy variation at normal temperature and normal pressure
$\Delta V^0$ Partial molal volume variation at normal temperature and normal pressure Table 5 shows a case of which the spectral data of the sample is acquired while varying the sample pressure, and variation of the sample volume by the sample pressure is set as the analysis target. The equilibrium model is a two-components equilibrium model composed of a reactant (Natural N) and a product (Denaturation D), and fitting of the concentration curve is executed by using two thermodynamic parameters ($\Delta G^0$, $\Delta V^0$) in the equation of the equilibrium constant K.

Next, an example is described in which the equilibrium model and the equation of equilibrium constant K of Table 6 is set.

TABLE 6

| Measurement spectral matrix X | Analysis target | Equilibrium model | Equilibrium constant K | Thermodynamic parameters |
|---|---|---|---|---|
| Spectral data of which an amount of ligands added to protein is varied | Affinity between proteins and ligands | $N + L \underset{}{\overset{K}{\rightleftharpoons}} NL$ | $\Delta G = -RT \ln K$<br>$\Delta G = \Delta H - T \Delta S$ | $\Delta H$<br>$\Delta S$ |

$Kx^2 - x(KL_t + KN_t + 1) + KL_t N_t = 0$     Equation (4)

Here, Equation (4) of equilibrium constant K is a basic equation that represents a relationship between the chemical-equilibrium constant K and the thermodynamic parameter, and in the equation,
$\Delta G$ Gibbs energy variation
R Gas constant
T Sample temperature
$\Delta H$ Enthalpy change
$\Delta S$ Entropy change Table 6 shows a case of which the spectral data of the sample is acquired while the amount of ligands added to protein is varied, and affinity between proteins and ligands is set as the analysis target. The reversible reaction that forms a complex (NL) by bonding of proteins (Natural N) and ligands (L) at a ratio of 1:1 is equilibrium. The equilibrium model uses the concentration ($N_t$) of total protein (N+NL), the concentration ($L_1$) of total ligands (L+NL), and the concentration (x) of the complex (NL), and the relationship between the equilibrium constant K and each concentration in the equilibrium model may be expressed as Equation (4). The equilibrium model is a three-components equilibrium model composed of the reactant (Natural N), a ligand (L) and the complex (NL), and uses two thermodynamic parameters ($\Delta H$, $\Delta S$) in the equation related to the equilibrium constant K to execute fitting of the concentration curve. For example, the sample temperature T is measured each time the amount of ligands added to protein is varied. Then, in the processing of constraining the concentration matrix C, the concentration curve based on the equation of Table 6, for example, is fitted to acquire the optimal values of the thermodynamic parameters ($\Delta H$, $\Delta S$).

In the above-described embodiments, cases of which the sample is mainly protein are described; however, the spectral analysis method, the analysis apparatus and the analysis program are applied to samples that contain substances that may change into different structures according to measurement parameters (for example, substances formed of proteins, peptides, nucleic acids, glycans, lipids, low molecules or a combination thereof), and are greatly useful for thermodynamically analyzing the equilibrium state between such substances having different structures.

According to the spectral analysis apparatus of the present embodiment:

(1) spectra of each chemical species can be separated accurately from spectral data in which spectra of a plurality of chemical species are combined, and the concentration values for each chemical species can be calculated; therefore, it is extremely useful in thermodynamic analysis of not only the equilibrium state of two-components system, but also the equilibrium state of three-components system, or greater.

(2) preprocessing of separating the components for each chemical species from the sample like in conventional techniques becomes unnecessary, and analysis can be performed with the spectral data of which the sample is measured as it is. Accordingly, thermodynamic analysis of the equilibrium state of multiple-components system can be executed smoothly. Moreover, analysis can be performed with a sample, the analysis target, is in a small amount.

(3) by imparting a constraint by the thermodynamic equilibrium model to the concentration distribution as a necessary constraint condition in executing MCR-ALS, the number of parameters for fitting can be made relatively smaller. Moreover, a suitable thermodynamic parameter that is physically and chemically meaningful can be acquired. Since the pure spectrum does not have to be non-negatively constrained, MCR-ALS can be applied to spectral data that contains positive and negative signals like CD spectrum.

(4) in biopharmaceuticals such as antibody drugs and nucleic-acid drugs of which a higher-order structure largely affects drug efficacy, for example, it is known that chemical species having different higher-order structures are present in an equilibrium state. Therefore, since the spectral analysis apparatus of the present embodiment can extract information of chemical species based on higher-order structures of antibodies and nucleic acid molecules, it is preferred in selecting of candidate substances of drugs or in analyzing denaturation mechanism in forced degradation study.

Example

Figure 5:
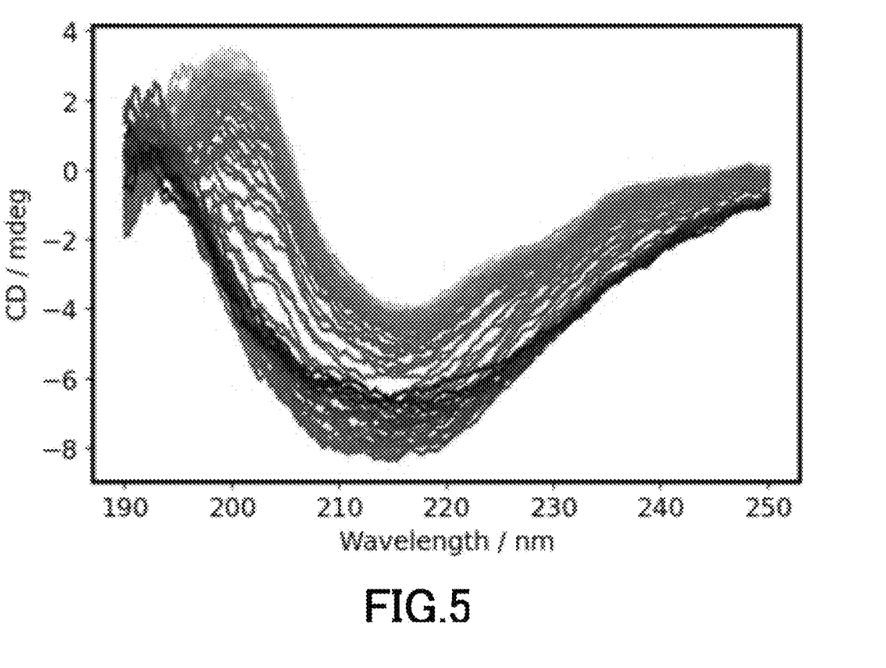
FIG. 5 is test data of temperature dependent CD spectra as an example of a plurality of measurement spectra.
Figure 6:
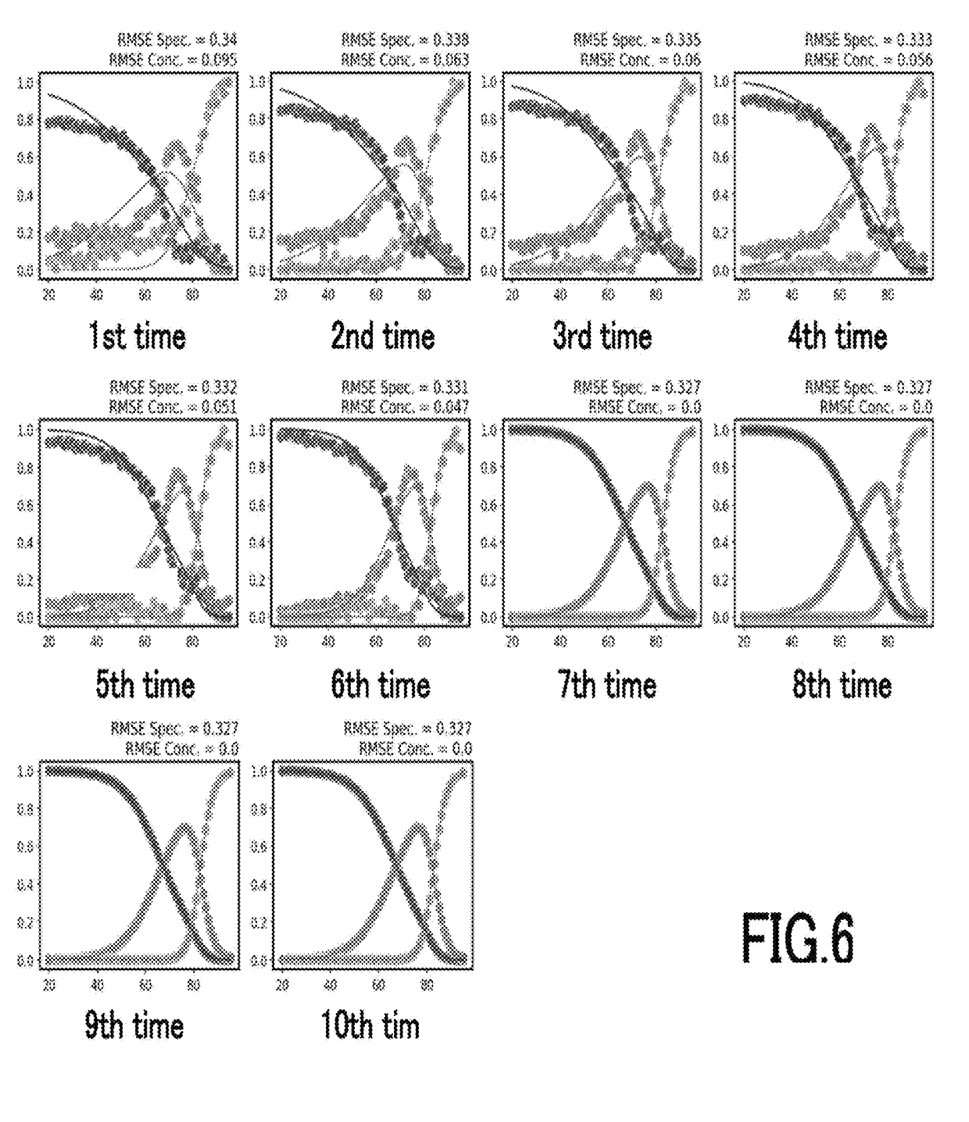
FIG. 6 is concentration graphs that illustrate result of performing MCR-ALS processing to the test data of FIG. 5 by the analysis apparatus for each number of iterations.
Figure 7:
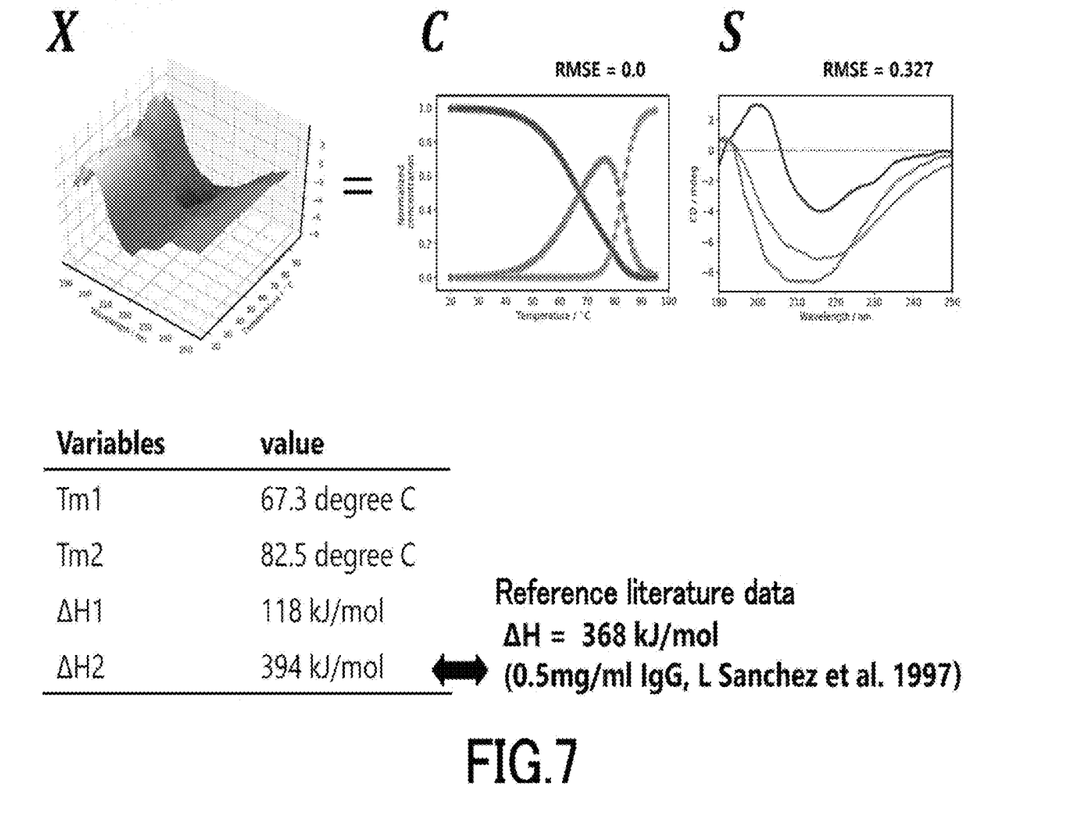
FIG. 7 is a diagram that illustrates a result of spectrally analyzing the test data of FIG. 5, that is, spectral graphs of a plurality of chemical species, graphs of concentration values of a plurality of chemical species, and calculated values of thermodynamic parameters, by the analysis apparatus.
Figure 8:
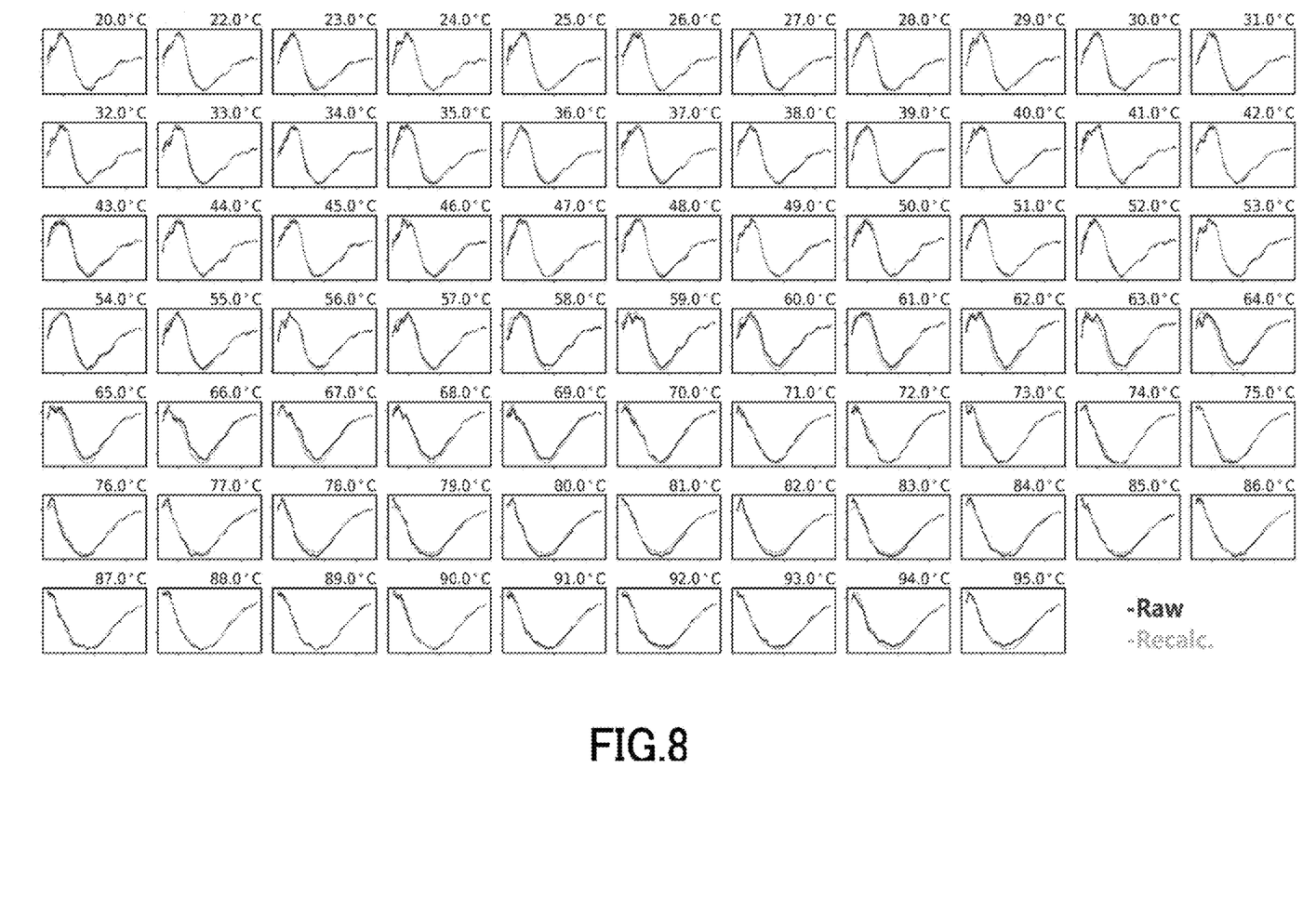
FIG. 8 is a diagram that illustrates a result of spectrally analyzing the test data of FIG. 5 by the analysis apparatus.

Using an antibody solution (1.1 mg/ml) of "IgG", one kind of an antibody, as a sample, CD spectral analysis was carried out while varying the sample temperature to acquire a test data of temperature dependent CD spectral data (FIG. 5). This test data was spectrally analyzed by the spectral analysis apparatus of the present embodiment to confirm its abilities. The equilibrium model and the equation of equilibrium constant K used for the constraint condition of the concentration matrix is the three-components equilibrium model as in Table 2. FIG. 6 shows a result (graph of concentration values) of which the test data of FIG. 5 was subjected to MCR-ALS processing for each number of iterations. In the 7th calculation, both of the root mean squared error of the pure spectrum (RMSE Spec.) and the root mean squared error of the concentration value (RMSE Conc.) become lower than specific threshold and determined to be "converged." The concentration distribution of each component improved as the number of iterations increased, and it became to show the concentration distribution corresponding to a specific equilibrium model. Moreover, the calculated value of the thermodynamic parameter was close to a value of enthalpy change $\Delta H$=368 kJ/mol of the antibody solution (0.5 mg/ml) of IgG disclosed in a literature data (L Sanchez et al., 1997). FIG. 7 shows spectral analysis results (a graph of spectra of a plurality of chemical species, a graph of concentration values for each chemical species, and a list of calculated values of thermodynamic parameters). Moreover, FIG. 8 is graphs in which complex spectra that synthesized the calculated concentration value and the separated pure spectrum are calculated for each temperature condition, and overlapped them with respective measurement spectra. The degree of coincidence of the two spectra was very high in all temperature conditions.

REFERENCE SIGNS LIST

1: Calculating apparatus
2: Data input portion
3: Operating portion
4: Display portion
5: Storage
10: Spectral analysis apparatus
12: MCR executing processor
14: Component number estimating processor
16: Concentration initial value estimating processor
20: Constraint condition setting processor
22: Equilibrium model setting processor
24: Chemical-equilibrium equation setting processor
26: Analysis result displaying processor
30: Spectral measurement apparatus

The invention claimed is:

1. A spectral analysis method for spectrally analyzing a plurality of measurement spectra by using Multivariate Curve Resolution (MCR) method comprising:
    optically measuring a sample in which three or more types of chemical species coexist,
    acquiring a measurement spectrum of the plurality of measurement spectra, that is represented as a linear combination of the same number of pure spectra as the number of components, using concentration values of the pure spectra as coefficients,
    setting an equilibrium model corresponding to an equilibrium state of the sample,
    setting at least one chemical-equilibrium equation corresponding to the equilibrium model, and
    applying the MCR method to the plurality of measurement spectra, wherein the applying the MCR method to the plurality of measurement spectra comprises:
        separating the same number of pure spectra as the number of components from the plurality of measurement spectra,
        calculating the concentration value of each pure spectrum, and
        repeating processes (A) and (B) to acquire a thermodynamic parameter, the pure spectra and the concentration value of each pure spectrum corresponding to the equilibrium model,
    wherein:
    (A) is a process of acquiring an optimal value of the thermodynamic parameter that configures the chemical-equilibrium equation by fitting a concentration curve based on the chemical-equilibrium equation to the calculated concentration value of each pure spectrum, and
    (B) is a process of acquiring a new concentration value from the chemical-equilibrium equation using the optimal value of the thermodynamic parameter, separating the pure spectra by using the new concentration value and calculating the concentration value of each pure spectrum corresponding to the equilibrium model.

2. The spectral analysis method of claim 1, wherein the measurement spectrum is data containing positive and negative spectral intensity values.

3. The spectral analysis method of claim 2, wherein the measurement spectrum is any one of a circular dichroism spectrum, a vibrational circular dichroism spectrum, a circularly polarized fluorescent spectrum, a fluorescence detection circular dichroism spectrum and an optical rotatory dispersion spectrum.

4. The spectral analysis method of claim 1, wherein: the plurality of measurement spectra is data measured while varying the equilibrium state of a reaction between a reactant and a product contained in the sample by sequentially varying a measurement parameter; the measurement parameter is any one of temperature, concentration, pH, pressure of the sample, applied electric field, applied magnetic field, irradiation light to the sample or a combination thereof; and thereby the thermodynamic parameter, the pure spectra and the concentration value of each pure spectrum corresponding to the equilibrium model regarding the reactant and the product are acquired.

5. The spectral analysis method of claim 4, wherein: the reaction between the reactant and the product includes a reaction between the reactant and an intermediate and a reaction between the intermediate and the product; and the thermodynamic parameter, the pure spectra and the concentration value of each pure spectrum corresponding to the equilibrium model regarding the reactant, the intermediate and the product are acquired.

6. The spectral analysis method of claim 5, wherein the thermodynamic parameter, the pure spectra and the concentration value of each pure spectrum corresponding to the equilibrium model regarding two or more types of chemical species that configure the intermediate are acquired inclusively.

7. The spectral analysis method of claim 4, wherein the thermodynamic parameter, the pure spectra and the concentration value of each pure spectrum corresponding to the equilibrium model regarding two or more types of chemical species that configure the reactant or the product are acquired inclusively.

8. The spectral analysis method of claim 4, wherein: the reactant and the product are substances formed of any one of proteins, peptides, nucleic acids, glycans, lipids, low molecules or a combination thereof; and the thermodynamic parameter, the pure spectra and the concentration value of each pure spectrum corresponding to the equilibrium model regarding the substance formed of any one of proteins, peptides, nucleic acids, glycans, lipids, low molecules or a combination thereof are acquired inclusively.

9. A spectral analysis apparatus comprising:
a spectral measurement apparatus configured to optically measure a sample in which three or more types of chemical species coexist,
a Multivariate Curve Resolution (MCR) executing processor that is configured to acquire a measurement spectrum of a plurality of measurement spectra, that is represented as a linear combination of the same number of pure spectra as the number of components, using concentration values of the pure spectra as coefficients, which separates the same number of pure spectra as the number of components from the plurality of measurement spectra and calculates the concentration value of each pure spectrum, and
a constraint condition setting processor that sets a constraint condition of the concentration value used for Multivariate Curve Resolution-Alternating Least Squares (MCR-ALS) in the MCR executing processor,
wherein:
the constraint condition setting processor is configured to set an equilibrium model corresponding to an equilibrium state of the sample, and set at least one chemical-equilibrium equation corresponding to the equilibrium model, and
the MCR executing processor is configured to repeat processes (A) and (B) to acquire a thermodynamic parameter, the pure spectra and the concentration value of each pure spectrum corresponding to the equilibrium model,
wherein:
(A) is a process of acquiring an optimal value of the thermodynamic parameter that configures the chemical-equilibrium equation by fitting a concentration curve based on the chemical-equilibrium equation to the calculated concentration value of each pure spectrum, and
(B) is a process of acquiring a new concentration value from the chemical-equilibrium equation using the optimal value of the thermodynamic parameter, separating the pure spectra by using the new concentration value and calculating the concentration value of each pure spectrum corresponding to the equilibrium model.

10. A non-transitory computer-readable storage medium having a spectral analysis program for spectrally analyzing a plurality of measurement spectra by using Multivariate Curve Resolution (MCR) method stored therein, the spectral analysis program causing a computer to execute a process of:
acquiring a measurement spectrum of the plurality of measurement spectra by optically measuring a sample in which three or more types of chemical species coexist,
acquiring a measurement spectrum of the plurality of measurement spectra that is represented as a linear combination of the same number of pure spectra as the number of components, using concentration values of the pure spectra as coefficients,
setting an equilibrium model corresponding to an equilibrium state of the sample,
setting at least one chemical-equilibrium equation corresponding to the equilibrium model, and
applying the MCR method to the plurality of measurement spectra, wherein the applying the MCR method to the plurality of measurement spectra comprises:
separating the same number of pure spectra as the number of components from the plurality of measurement spectra,
calculating the concentration value of each pure spectrum, and
repeating processes (A) and (B) to acquire a thermodynamic parameter, the pure spectra and the concentration value of each pure spectrum corresponding to the equilibrium model,
wherein:
(A) is a process of acquiring an optimal value of the thermodynamic parameter that configures the chemical-equilibrium equation by fitting a concentration curve based on the chemical-equilibrium equation to the calculated concentration value of each pure spectrum, and
(B) is a process of acquiring a new concentration value from the chemical-equilibrium equation using the optimal value of the thermodynamic parameter, and separating the pure spectra by using the new concentration value and calculating the concentration value of each pure spectrum corresponding to the equilibrium model.

* * * * *